(12) United States Patent
Tokiwa et al.

(10) Patent No.: US 7,526,985 B2
(45) Date of Patent: May 5, 2009

(54) SAWING MACHINE, CUTTING-OFF METHOD, AND METHOD OF REDUCING NOISE

(75) Inventors: Toru Tokiwa, Kanagawa (JP); Kinshiro Naito, Kanagawa (JP)

(73) Assignee: Amada Company, Limited, Kanagawa (JP)

(*) Notice: Subject to any disclaimer, the term of this patent is extended or adjusted under 35 U.S.C. 154(b) by 113 days.

(21) Appl. No.: 10/547,319

(22) PCT Filed: Mar. 4, 2004

(86) PCT No.: PCT/JP2004/002739

§ 371 (c)(1),
(2), (4) Date: Feb. 28, 2006

(87) PCT Pub. No.: WO2004/080634

PCT Pub. Date: Sep. 23, 2004

(65) Prior Publication Data

US 2006/0144202 A1    Jul. 6, 2006

(30) Foreign Application Priority Data

| Mar. 4, 2003 | (JP) | ............................. 2003-057655 |
| Nov. 21, 2003 | (JP) | ............................. 2003-392256 |
| Dec. 26, 2003 | (JP) | ............................. 2003-435627 |
| Dec. 26, 2003 | (JP) | ............................. 2003-435646 |

(51) Int. Cl.
*B23D 55/08*      (2006.01)

(52) U.S. Cl. .................. 83/13; 83/72; 83/788

(58) Field of Classification Search .............. 83/13, 83/72, 74, 75, 788, 800

See application file for complete search history.

(56) References Cited

U.S. PATENT DOCUMENTS

| 4,357,848 | A | * | 11/1982 | Sakurai et al. ................. 83/72 |
| 4,358,974 | A | * | 11/1982 | Sakurai ......................... 83/72 |
| 4,481,845 | A | * | 11/1984 | Sakurai et al. ................. 83/72 |
| 4,700,597 | A | * | 10/1987 | Taguchi ......................... 83/72 |
| 4,736,625 | A | * | 4/1988 | Patterson et al. .............. 73/104 |
| 5,115,403 | A | * | 5/1992 | Yoneda et al. ................. 83/72 |
| 5,119,310 | A | * | 6/1992 | Moriya ......................... 83/72 |
| 5,208,760 | A | * | 5/1993 | Moriya ........................ 83/820 |
| 6,167,324 | A | * | 12/2000 | Gorman ....................... 83/789 |

FOREIGN PATENT DOCUMENTS

| JP | 48-109586 | 8/1972 |
| JP | 55-164415 | 12/1980 |

(Continued)

OTHER PUBLICATIONS

English Language Abstract of JP 11-104915.

(Continued)

*Primary Examiner*—Stephen Choi
(74) *Attorney, Agent, or Firm*—Greenblum & Bernstein, P.L.C.

(57) ABSTRACT

A band saw machine includes a driving wheel and a driven wheel around which an endless band saw blade is wound. At least one of the driving wheel and the driven wheel is directly connected to an output shaft of a control motor. The output shaft of the control motor is arranged in a cylindrical bearing unit installed on a motor base supporting the control motor. The driving wheel is rotatably supported by the bearing unit.

1 Claim, 10 Drawing Sheets

FOREIGN PATENT DOCUMENTS

| JP | 57-20095 | 4/1982 |
| JP | 57-107730 | 7/1982 |
| JP | 57-127620 | 8/1982 |
| JP | 58-52767 | 11/1983 |
| JP | 59-201718 | 11/1984 |
| JP | 60-94217 | 5/1985 |
| JP | 60-127917 | 7/1985 |
| JP | 60-35561 | 10/1985 |
| JP | 63-26462 | 4/1988 |
| JP | 1-295712 | 11/1989 |
| JP | 3-142125 | 6/1991 |
| JP | 4-159049 | 6/1992 |
| JP | 8-197330 | 8/1996 |
| JP | 10-138045 | 5/1998 |
| JP | 10-309624 | 11/1998 |
| JP | 11-104915 | 4/1999 |

OTHER PUBLICATIONS

English Language Abstract of JP 08-197330.
English Language Abstract of JP 10-309624.
English Language Abstract of JP 01-295712.
English Language Abstract of JP 57-107730.
English Language Abstract of JP 10-138045.
English Language Abstract of JP 55-164415.
English Language Abstract of JP 60-127917.
English Language Abstract of JP 56-069022.
English Language Abstract of JP 57-107730.
English Language Abstract of JP 57-127620.
English Language Abstract of JP 03-142125.
English language Abstract of JP 63-26462.
English language Abstract of JP 4-159049.
English language Abstract of JP 60-94217.
English language Abstract of JP 60-35561.
English language Abstract of JP 59-201718.
Kumabe, "Section 12.3.4: 100 Hz Oscillation band saw machine for metal" in "Precision Machining by Vibrating Cutting—Fundamentals and Applications" (in Japanese), JitsuKyo Shutsuban, 1979, p. 342, together with an English language Abstract thereof.

* cited by examiner

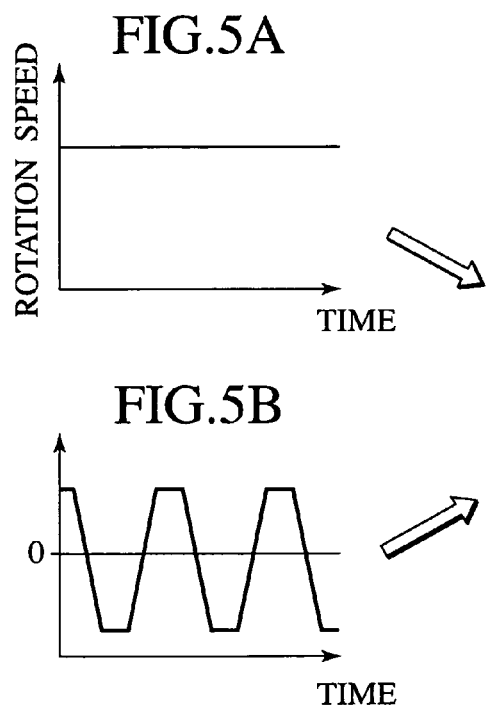
FIG.5A
FIG.5B
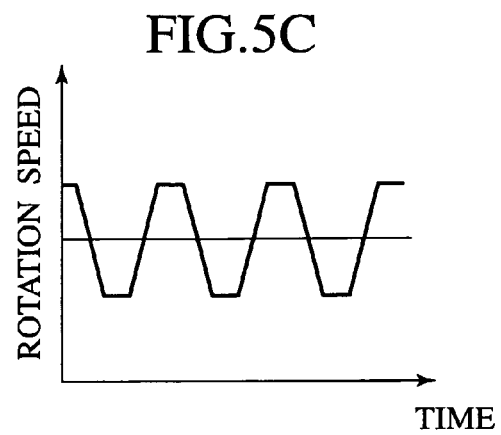
FIG.5C
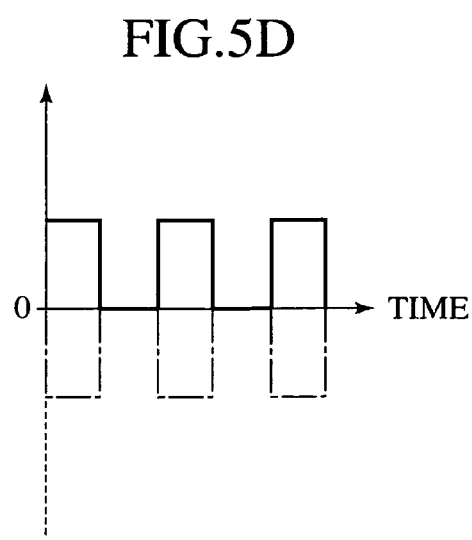
FIG.5D
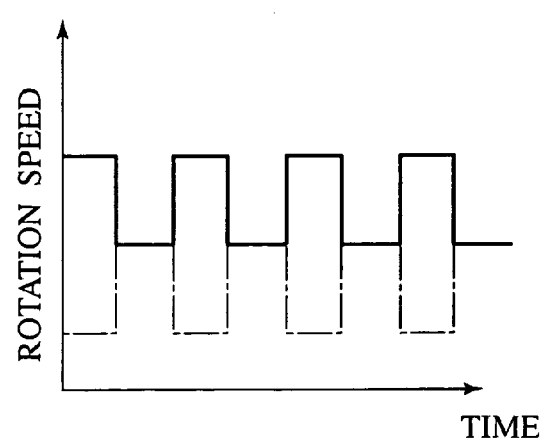
FIG.5E

SAWING MACHINE, CUTTING-OFF METHOD, AND METHOD OF REDUCING NOISE

TECHNICAL FIELD

The present invention relates to a sawing machine, a cutting method, and a noise reduction method. More particularly, the present invention relates to a sawing machine, in which a driving wheel around which a band saw blade is wound on a band saw machine and an output shaft of a control motor such as a servomotor are directly connected with each other, and a cutting method and a noise reduction method in the band saw machine.

BACKGROUND ART

In the band saw machine in the background art, as shown in FIG. 1, a motor 34 for rotating a driving wheel 29 is fitted to the back of a wheel housing 27A, and a speed reducer 37 formed of, for example, a planetary gear mechanism or a worm gear mechanism is equipped between an output shaft 35 of the motor 34 and a shaft 29A of the driving wheel 29. This configuration is disclosed in Japanese Patent Application Laid-Open No. H11-104915.

Conventionally, in order to cut a workpiece while keeping the cutting rate (a cutting area per unit time) constant, the cutting speed of the band saw blade with respect to the workpiece is controlled corresponding to the cutting length of the workpiece, or the traveling speed of the band saw blade is periodically controlled by an inverter to reduce noise due to the resonance during cutting of the workpiece. This technique is disclosed in Japanese Patent Application Laid-Open No. H8-197330.

In the configuration in which the speed reducer is placed between the motor and the driving wheel, however, the number of components increases to make the configuration complicated, and maintenance is required relatively frequently. Furthermore, there is a problem in that the moment of inertia increases to make it difficult to perform micro-control of the saw speed.

Conventionally, the saw speed is controlled during cutting of the workpiece by the band saw blade, however, it is to control the saw speed periodically, and for example, it is difficult to oscillate the saw speed, for example, as if vibratory cutting is being performed.

In the conventional technique, the saw speed is controlled during cutting of the workpiece by the band saw blade, however, it is to control the saw speed periodically, and for example, it is difficult to oscillate the saw speed, for example, as if vibratory cutting is being performed. When the workpiece causes work hardening, it has been difficult to cut the workpiece.

In the conventional band saw machine, as the configuration for reducing noise generated at the time of cutting the workpiece, a configuration in which the sawteeth pitch of the band saw blade is made unequal in order to prevent noise generation due to the resonance of the band saw blade, or a configuration in which a vibration-isolating roller having a large mass is pressed against the band saw blade has been adopted. Furthermore, in order to control the cutting speed of the band saw blade with respect to the workpiece corresponding to the cutting length of the workpiece, or to reduce noise due to the resonance during cutting of the workpiece, the rotation speed of the band saw blade is periodically controlled by an inverter. This technique is disclosed in Japanese Patent Application Laid-Open No. H8-197330.

As described above, in the configuration in which the sawteeth pitch of the band saw blade is made unequal, or the configuration in which the vibration-isolating roller is pressed against the band saw blade, noise can be reduced to some extent, however, further improvement is required for reducing chatter due to longitudinal vibrations of the band saw blade at the time of cutting the workpiece.

In the configuration in which the rotation speed of the band saw blade is periodically controlled by inverter control, noise due to the resonance can be reduced, however sometimes, two sound waves having a slightly different oscillation frequency interfere with each other to cause swells such that the sound becomes strong and weak periodically. Furthermore, in order to reduce chatter due to longitudinal vibrations of the band saw blade at the time of cutting the workpiece, further improvement is required.

The present invention has been achieved in order to solve the above problems. It is a first object of the present invention to provide a band saw machine and a cutting method, which can simplify the configuration of the drive system and can easily cut a workpiece, which is likely to cause work hardening, and a noise reduction method.

It is a second object of the present invention to provide a band saw machine, a cutting method, and a noise reduction method, which can reduce longitudinal vibrations of the band saw blade due to rubbing of the band saw blade against the workpiece at the time of cutting the workpiece, thereby reducing noise due to the longitudinal vibrations.

DISCLOSURE OF THE INVENTION

To achieve the above objects, a first aspect of the present invention provides a band saw machine comprising a driving wheel and a driven wheel around which an endless band saw blade is wound, wherein at least one of the driving wheel and the driven wheel is directly connected to an output shaft of a control motor.

A second aspect of the present invention provides the band saw machine according to the first aspect, wherein the output shaft of the control motor is arranged in a cylindrical bearing unit installed on a motor base supporting the control motor, and the driving wheel is rotatably supported by the bearing unit.

A third aspect of the present invention provides the band saw machine according to the first or the second aspect, comprising a rotation speed controller for controlling the rotation speed of the control motor, a motor driver for driving the control motor under the control of the rotation speed controller, and a pulse generator that applies a pulse to the motor driver in order to oscillate the rotation speed of the rotating control motor, under the control of the rotation speed controller.

A fourth aspect of the present invention provides the band saw machine according to any one of the first to the third aspects, wherein the frequency of the pulse applied by the pulse generator is as low as several Hz to several hundred HZ.

A fifth aspect of the present invention provides the band saw machine according to any one of the first to the fourth aspects, comprising a cutting position detector for detecting a cutting position of the band saw blade with respect to the workpiece, a cutting length calculator that calculates the cutting length based on the cutting position detected by the cutting position detector, and the shape and the size of the workpiece, and a saw speed calculator that calculates the saw speed corresponding to the cutting length calculated by the cutting length calculator and outputs a rotation speed instruction to the rotation speed controller.

A sixth aspect of the present invention provides the band saw machine according to any one of the first to the fifth aspects, comprising a cutting speed controller for controlling the cutting speed of the band saw blade with respect to the workpiece, wherein the cutting speed of the band saw blade with respect to the workpiece is instantaneously accelerated under the control of the cutting speed controller, at the time of fall of the pulse output from the pulse generator.

A seventh aspect of the present invention provides a cutting method for cutting a workpiece by moving an endless band saw blade equipped on a band saw machine, wherein the traveling speed of the band saw blade is oscillated.

An eighth aspect of the present invention provides the cutting method according to the seventh aspect, wherein the cutting speed of the band saw blade with respect to the workpiece is oscillated to cut the workpiece.

A ninth aspect of the present invention provides the cutting method according to the seventh or the eighth aspect, wherein the traveling speed and the cutting speed with respect to the workpiece of the band saw blade are controlled to be low to cut the workpiece, in the initial stage and in the final stage of cutting with respect to the workpiece.

According to the band saw machine and the cutting method in the first to the ninth aspects of the present invention, since the driving wheel and the output shaft of the control motor are directly connected to each other, the configuration of the drive system can be simplified. Furthermore, since the traveling speed of the band saw blade is oscillated to cut the workpiece, thereby realizing vibratory cutting, and hence, even cutting of a workpiece, which is likely to cause work hardening, can be performed easily.

A tenth aspect of the present invention provides a cutting method, wherein when the rotation of the control motor is controlled under a set machining condition to rotate the saw blade and perform cutting of the workpiece, and when noise, wear, or a cutting resistance of the saw blade equal to or higher than a reference value is detected, for example, a rectangular pulse having rectangular waves is applied to a motor driver by a pulse generator, to oscillate the rotation speed of the control motor, and the rotation of the saw blade is oscillated to continue cutting of the workpiece.

An eleventh aspect of the present invention provides a cutting method, wherein when the rotation of the control motor is controlled under the set machining condition to rotate the saw blade and the cutting speed of the saw blade with respect to the workpiece is controlled by a cutting speed controller to perform cutting of the workpiece, and when noise, wear, or a cutting resistance of the saw blade equal to or higher than a reference value is detected, for example, a rectangular pulse having rectangular waves is applied to a motor driver by a pulse generator, to oscillate the rotation speed of the control motor, and the rotation and the cutting speed of the saw blade are also oscillated, to continue cutting of the workpiece.

A twelfth aspect of the present invention provides a sawing machine comprising: a saw blade directly rotated by a control motor; a rotation speed controller for controlling the rotation speed of the control motor; a motor driver that drives the control motor under the control of the rotation speed controller; a pulse generator that applies a pulse to the motor driver in order to oscillate the rotation speed of the rotating control motor, under the control of the rotation speed controller; a noise detector for detecting noise at the time of cutting the workpiece, or a wear detector for detecting the wear of the saw blade, or a cutting resistance detector for detecting the cutting resistance; and a comparator that compares the detected value of the noise, or the detected value of the wear, or the detected value of the cutting resistance with the reference value.

A thirteenth aspect of the present invention provides the sawing machine according to the twelfth aspect, comprising a cutting speed controller for controlling the cutting speed of the saw blade with respect to the workpiece, wherein the cutting speed of the saw blade with respect to the workpiece is instantaneously accelerated under the control of the cutting speed controller, corresponding to the pulse output from the pulse generator.

A fourteenth aspect of the present invention provides the sawing machine according to the twelfth aspect or the thirteenth aspect, wherein the frequency of the pulse applied by the pulse generator is as low as several Hz to several hundred HZ.

According to the sawing machine and the cutting method in the tenth to the fourteenth aspects of the present invention, when the noise becomes equal to or higher than the reference value, when the wear of the sawteeth becomes equal to or higher than the reference value, or when the cutting resistance becomes equal to or higher than the reference value, the traveling speed of the band saw blade is oscillated to cut the workpiece, thereby realizing vibratory cutting. Accordingly, generation of noise can be reduced, and even cutting of a workpiece, which is likely to cause work hardening, can be performed easily, thereby enabling improvement in the cutting efficiency.

A fifteenth aspect of the present invention provides a noise reduction method for reducing noise due to longitudinal vibrations of the band saw blade at the time of cutting a workpiece by a band saw machine, wherein sudden acceleration and deceleration are applied to the band saw blade to oscillate the rotation speed of the band saw blade, thereby reducing noise due to longitudinal vibrations of the band saw blade.

A sixteenth aspect of the present invention provides the noise reduction method according to the fifteenth aspect, wherein the sudden acceleration and deceleration of the band saw blade are realized by applying, for example, a rectangular pulse having rectangular waves, to a control motor for rotating the band saw blade.

A seventeenth aspect of the present invention provides the noise reduction method according to the fifteenth or the sixteenth aspect, wherein the frequency of the rectangular pulse to be applied to the control motor is adjusted to determine an appropriate frequency, and the rectangular pulse of the determined appropriate frequency is applied to the control motor.

An eighteenth aspect of the present invention provides a sawing machine comprising: a control motor for rotating a driving wheel on a band saw machine; a rotation speed controller for controlling the rotation speed of the control motor; a motor driver that drives the control motor under the control of the rotation speed controller; a pulse generator that applies a pulse to the motor driver in order to accelerate and decelerate suddenly the rotation of the rotating control motor, under the control of the rotation speed controller; and a frequency adjuster that adjusts the frequency of the pulse applied by the pulse generator.

A nineteenth aspect of the present invention provides the sawing machine according to the eighteenth aspect, comprising: a noise detector for detecting noise at the time of cutting the workpiece; a frequency analyzer that analyzes the frequency of the noise detected by the noise detector; and a noise data table in which the frequency band of the noise and the frequency band of the pulse to be applied are stored in association with each other.

A twentieth aspect of the present invention provides the sawing machine according to the eighteenth or the nineteenth aspect, comprising a storage unit that stores the frequency of the pulse applied by the pulse generator and the noise level detected by the noise detector in association with each other, and a comparator that compares the noise level stored in the storage unit with a new noise level detected by the noise detector, to calculate a minimum noise level.

A twenty-first aspect of the present invention provides the sawing machine according to any one of the eighteenth to the twentieth aspects, comprising a memory for storing the frequency of the pulse at the minimum noise level calculated by the comparator and the frequency of noise to be reduced, in association with each other.

According to the noise reduction method and the sawing machine in the fifteenth to the twenty-first aspects, by suddenly accelerating and decelerating the rotation speed of the band saw blade, the rotation speed of the band saw blade can be oscillated, thereby realizing a mode in which vibratory cutting is performed by the band saw blade. Accordingly, longitudinal vibrations of the band saw blade due to rubbing of the band saw blade against the workpiece at the time of cutting the workpiece can be reduced, thereby reducing noise due to the longitudinal vibrations.

BRIEF DESCRIPTION OF DRAWINGS

FIGS. 5A, 5B, 5C, 5D, and 5E are explanatory diagrams illustrating a case when the rotation speed of a control motor is oscillated;

BEST MODE FOR CARRYING OUT THE INVENTION

Exemplary embodiments of the present invention will be explained below with reference to the drawings.

Figure 3:
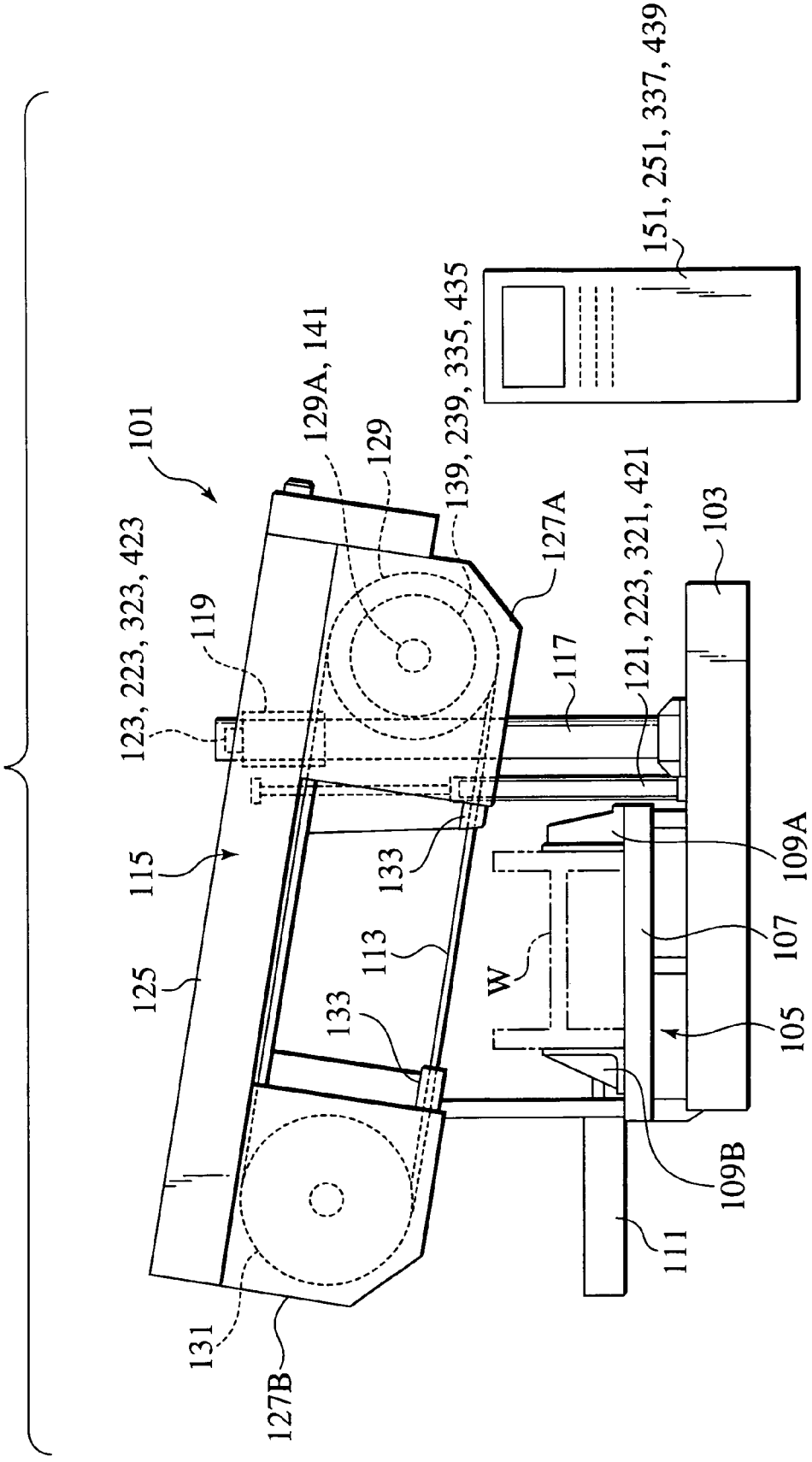
FIG. 3 is an explanatory front elevation illustrating the overall configuration of a horizontal band saw machine as an example of the band saw machine.

A band saw machine (a sawing machine) includes a vertical band saw machine and a horizontal band saw machine. For facilitating understanding, the overall configuration will be schematically explained by exemplifying the horizontal band saw machine. As shown in FIG. 3, a horizontal band saw machine 101 includes a base 103, and a vise device 105 that can freely fix a workpiece W to be cut is installed on the base 103. The vise device 105 includes a fixed vise jaw 109A and a movable vise jaw 109B facing each other on a vise bed 107 that supports the workpiece W, and also includes a hydraulic cylinder 111 for operating the movable vise jaw 109B. A saw blade housing 115, as a cutting head, including a band saw blade 113 for cutting the workpiece W, is provided on the base 103 in the directions of relatively approaching and parting from the workpiece W, that is, in the example in the figure, the saw blade housing 115 is provided movably upward and downward.

That is, in the embodiment, a lift member 119 integrally formed with the saw blade housing 115 is guided movably up and down by a guide post 117 arranged in a standing condition on the base 103. A hydraulic cylinder 121 for lifting is provided as an example of a cutting actuator, in order to shift the saw blade housing 115 in the direction approaching and parting from the workpiece W, that is, in the vertical direction. Furthermore, a cutting position detector 123 that detects a position in the vertical motion of the saw blade housing 115 to detect the cutting position of the band saw blade 113 with respect to the workpiece W is provided in the horizontal band saw machine 101.

The cutting position detector 123 may have a configuration including a vertical linear case and a detection head, for example, provided on the guide post 117, or may have a configuration in which a rotary encoder is rotated by a pinion engaged with a rack. In a mode in which the saw blade housing 115 swings vertically, the rotary encoder may be provided on a hinge in the saw blade housing. Thus, various configurations can be used.

The saw blade housing 115 includes wheel housings 127A, 127B on the left and right sides of a beam member 125 long in the longitudinal direction. A driving wheel 129 is rotatably provided in one of the wheel housings, 127A, and a driven wheel 131 is rotatably provided in the other wheel housing 127B. The band saw blade 113 is spanned between the driving wheel 129 and the driven wheel 131, and a band saw blade guide apparatus 133 that guides and holds the band saw blade 113, with the point of the band saw blade 113 directed toward the workpiece W, is provided between the both wheel housings 127A and 127B.

Figure 1:
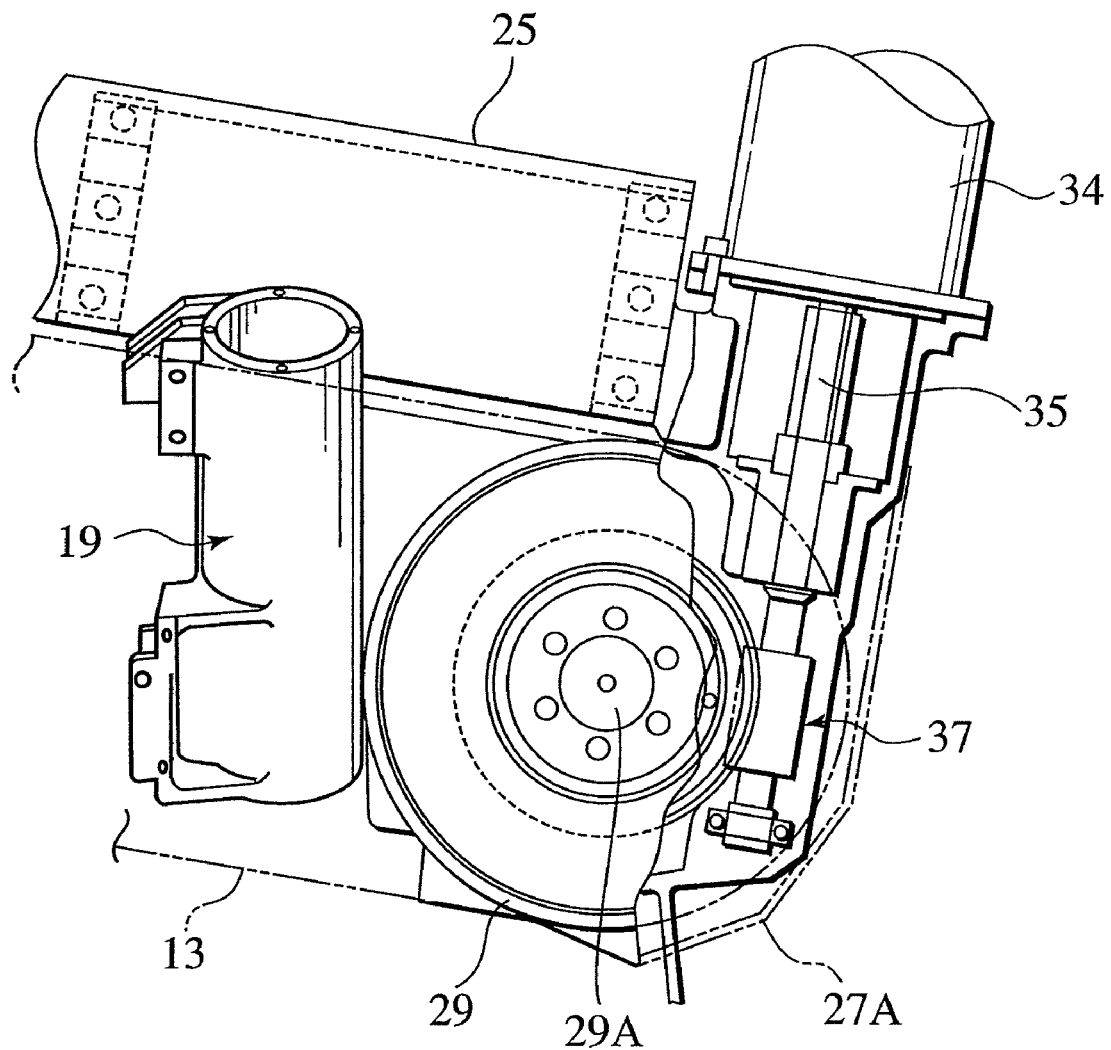
FIG. 1 is an explanatory cross section illustrating an example of a conventional drive system.
Figure 2:
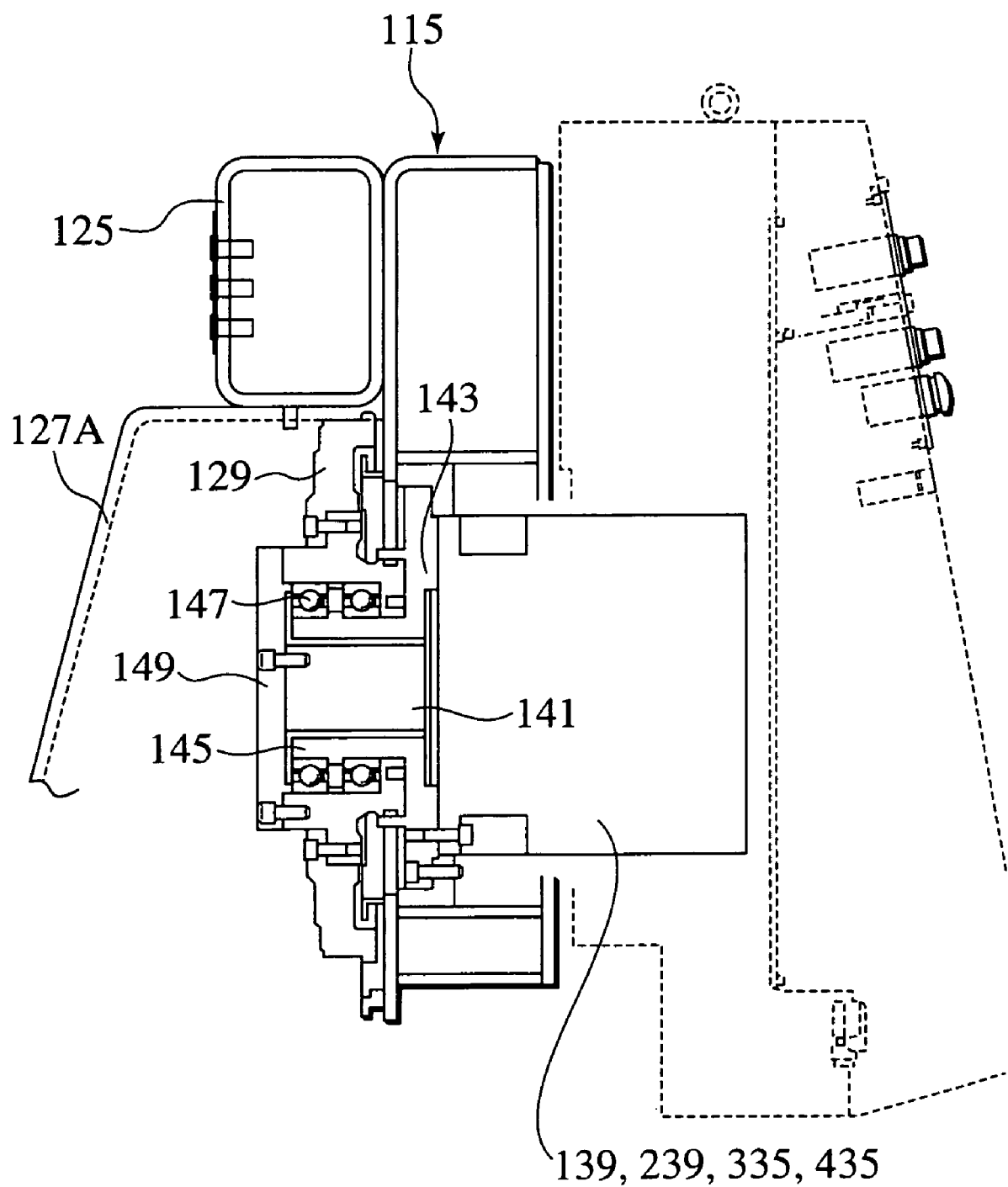
FIG. 2 is an explanatory cross section illustrating the configuration of the relevant part of a band saw machine according to a first embodiment of the present invention.

In the embodiment, as shown in FIG. 2, a control motor 139 such as a servomotor is used as the motor for rotating the driving wheel 129, and an output shaft 141 of the control motor 139 and the driving wheel 129 are directly connected to each other.

More specifically, the control motor 139 is fitted to a motor base 143 fitted to the saw blade housing 115 via a fixture such as bolt, and the output shaft 141 is arranged in a cylindrical bearing unit 145 installed on the motor base 143. The driving wheel 129 is rotatably supported by the bearing unit 145, via a bearing 147 arranged on the outer circumference of the bearing unit 145, and a wheel cap 149 integrally formed with the driving wheel 129 and the output shaft 141 are integrally connected via a connecting fixture such as a plurality of bolts.

When rotating the control motor 139, the output shaft 141 and the driving wheel 129 integrally and directly connected therewith are integrally rotated, so that the band saw blade 113 spanned between the driving wheel 129 and the driven wheel 131 is driven to perform cutting of the workpiece W. Since the radial load at the time of cutting of the workpiece W is received by the bearing unit 145 in the motor base 143, the radial load does not act on the output shaft 141 in the control motor 139, thereby enabling smooth rotation at all times.

Figure 4:
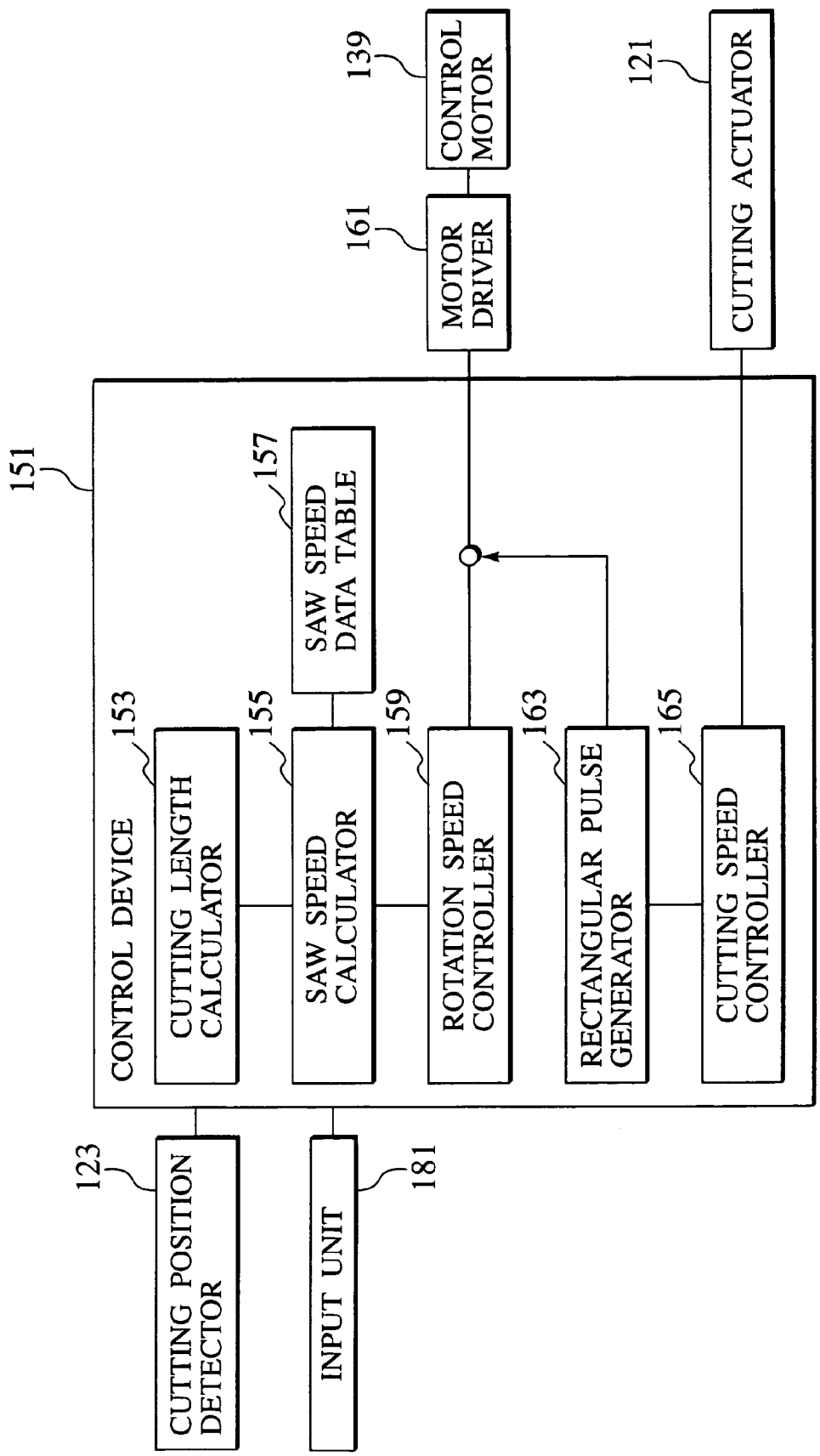
FIG. 4 is an explanatory block diagram conceptually illustrating the configuration of the relevant part that controls the saw speed of a band saw blade.
Figure 6A:
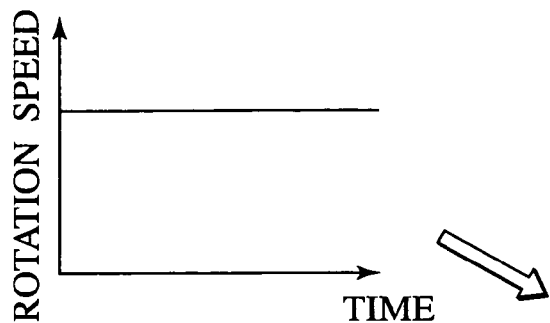
FIGS. 6A, 6B, and 6C are explanatory diagrams illustrating a second example of an applied pulse.
Figure 6B:
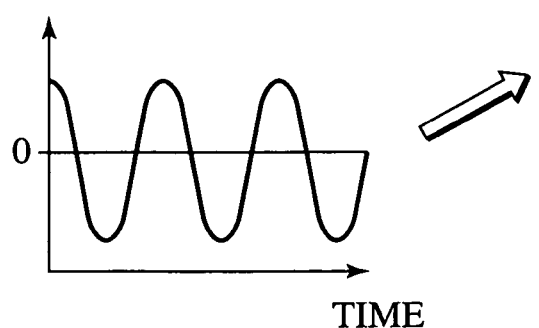
Figure 6C:
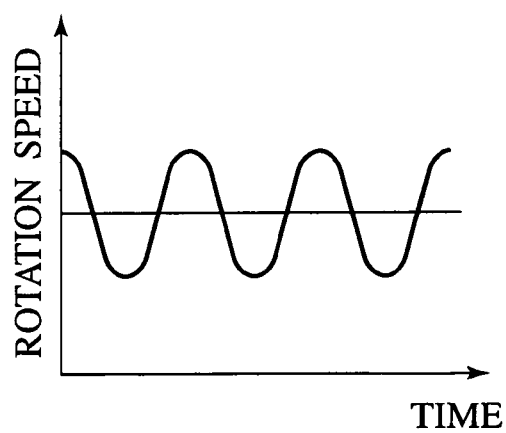

A control device 151 such as a CNC unit is equipped for controlling the band saw machine 101. As shown in FIG. 4, where only the relevant part is conceptually and schematically, the control device 151 includes a cutting length calculator 153 that calculates the cutting length of the workpiece W based on the position detected by the cutting position detector 123 that detects the cutting position of the band saw blade 113 with respect to the workpiece W, and the shape and the size of the workpiece W input beforehand by an input unit 181.

Furthermore, the control device 151 includes a saw speed calculator 155 that calculates the traveling speed of the band saw blade 113 based on the calculation result of the cutting length calculator 153. The saw speed calculator 155 searches an appropriate saw speed corresponding to the material and the cutting length of the workpiece W in a saw speed data table 157, in which the relation between the cutting length and the saw speed is stored in data corresponding to the material of the workpiece W.

The control device 151 includes a rotation speed controller 159 for controlling the rotation speed of the control motor 139 based on the calculation result of the saw speed calculator 155, so that the rotation speed of the control motor 139 is controlled via a motor driver 161 under the control of the rotation speed controller 159. A rectangular pulse generator 163 is equipped in the control device 151 as an example of a pulse generator that applies a rectangular pulse, as an example of pulses, to the motor driver 161, to oscillate the rotation speed of the control motor 139.

The rectangular pulse generator 163 oscillates, for example, the rotation speed of the control motor 139 rotating at a constant rotation speed under the control of the rotation speed controller 159, to oscillate the speed of the band saw blade 113 so that the band saw blade 113 traveling at a constant speed oscillates in the traveling direction (moving direction) of the band saw blade 113. In other words, the saw speed is instantaneously changed as if the band saw blade 113, for example, traveling at a constant speed is performing vibratory cutting.

Furthermore, the control device 151 includes a cutting speed controller 165 for controlling the operation of the hydraulic cylinder 121 for lifting, as one example of the cutting actuator, to control the cutting speed of the band saw blade 113 with respect to the workpiece W. The cutting speed controller 165 includes a flow control valve, when the cutting actuator is formed of a fluid pressure cylinder, or a rotation speed controller that controls the rotation speed of the servomotor, when the cutting actuator is formed of, for example, a ball screw or the like rotated by the servomotor.

When rotating the control motor 139 and operating the cutting actuator 121 to start cutting of the workpiece W, the cutting position of the band saw blade 113 with respect to the workpiece W can be detected by the cutting position detector 123. Therefore, as in the conventional normal band saw machine, cutting (hollow cutting) is performed at a high speed until the band saw blade 113 approaches the workpiece W, and when the band saw blade 113 approaches the workpiece W, the cutting speed is controlled to a low speed. Cutting by the band saw blade 113 is then performed with respect to the workpiece W at the low cutting speed.

In the initial stage of cutting until the band saw blade 113 comes in contact with the workpiece W to cut the workpiece W slightly, the traveling speed of the band saw blade 113 is controlled to a low speed under the control of the rotation speed controller 159. That is, at the time of start cutting of the workpiece W by the band saw blade 113, the cutting speed and the saw speed are controlled to a low speed so that a large load does not suddenly act on the sawteeth to cause broken teeth. Furthermore, at the end of cutting of the workpiece W by the band saw blade 113, the traveling speed and the cutting speed with respect to the workpiece of the band saw blade 113 are controlled to a low speed, in order to suppress occurrence of burr.

The cutting position of the band saw blade 113 with respect to the workpiece W is detected by the cutting position detector 123, and the cutting length of the workpiece W is calculated by the cutting length calculator 153 based on the detected cutting position. The saw speed corresponding to the cutting length is calculated by the saw speed calculator 155 based on the calculation result, and the saw speed is controlled corresponding to the cutting length of the workpiece W under the control of the rotation speed controller 159.

As described above, when the rotation speed of the control motor 139 is controlled via the motor driver 161 under the control of the rotation speed controller 159, and the band saw blade 113 is driven to cut the workpiece W, the rectangular pulse is generated by the rectangular pulse generator 163 and applied to the motor driver 161, thereby oscillating the rotation speed of the control motor 139.

In other words, for example as shown in FIG. 5A, when the control motor 139 is in a rotating state at a constant speed, a rectangular pulse with a sharp rise is applied from the rectangular pulse generator 163 to the motor driver 161 as shown in FIGS. 5B and 5D, the rotation speed of the control motor 139 is instantaneously accelerated as shown in FIGS. 5C and 5E. On the contrary, application of a rectangular pulse with a sharp fall to the motor driver 161 instantaneously decelerates the rotation speed of the control motor 139. Therefore, by applying the rectangular pulse to the motor driver 161 from the rectangular pulse generator 163, the rotation speed of the control motor 139 can be oscillated, thereby oscillating the traveling speed of the band saw blade 113.

That is, when the band saw blade 113 cuts the workpiece W, the band saw blade 113 vibrates in the traveling direction (moving direction), as if it is performing vibratory cutting. Accordingly, when the band saw blade 113 is instantaneously accelerated, the band saw blade 113 is suddenly moved vigorously, and hence, cutting of the workpiece W can be performed efficiently.

The applied pulse may be only a positive pulse or only a negative pulse, and is not limited to the rectangular pulse, so long as the pulse has a waveform with sharp rise and fall. As shown in FIGS. 3, 6A, 6B, and 6C, the pulse may be a sinusoidal pulse approximate to a state in which the angle of the rectangular pulse becomes dull.

In a general machine tool, when vibratory cutting of the workpiece is performed by moving a cutting tool with respect to a rotating workpiece, high frequency of several kHz is applied to the cutting tool to vibrate the cutting tool minutely. In the band saw machine, when the traveling speed of the band saw blade 113 is to be oscillated, it is necessary to oscillate the rotation speed of the control motor 139 for rotating the band saw blade 113.

In the band saw machine, however, since the weight of the driving wheel 129 around which the band saw blade 113 is wound is large and the inertia is large, even if a high-frequency pulse is applied to the motor driver 161, it is difficult to oscillate the rotation speed of the control motor 139 as intended. Therefore, in order to oscillate the rotation speed of the control motor 139 to oscillate the traveling speed of the band saw blade 113, it is desired to apply a rectangular pulse, which is of a low frequency of from several to several hundred HZ, desirably of about 100 Hz, and has clear rise and fall, to the motor driver 161.

That is, by applying the low-frequency rectangular pulse to the motor driver 161 by the rectangular pulse generator 163, the rotation speed of the control motor 139 and the traveling speed of the band saw blade 113 can be oscillated.

When the rectangular pulse generator 163 applies the rectangular pulse to the motor driver 161 to cut the workpiece W by oscillating the traveling speed of the band saw blade 113, the saw speed is instantaneously accelerated sharply at the time of rise of the rectangular pulse, and is instantaneously decelerated sharply at the time of fall of the rectangular pulse, when the rectangular pulse is applied by the rectangular pulse generator 163.

Therefore, the cutting actuator 121 is controlled by the cutting speed controller 165 at the time of fall of the rectangular pulse applied to the motor driver 161 by the rectangular pulse generator 163, to accelerate the cutting speed of the band saw blade 113 with respect to the workpiece W instantaneously sharply, thereby enabling efficient biting into the workpiece W of the sawteeth of the band saw blade 113.

That is, it is desired to oscillate the band saw blade 113 in the moving direction as well as the cutting speed of the band saw blade 113 with respect to the workpiece W. In this case, by suddenly accelerating the cutting speed of the band saw blade 113 with respect to the workpiece W when the traveling speed of the band saw blade 113 is low, biting into the workpiece W of the sawteeth is performed efficiently. At this time, even if a work hardening layer is generated in the workpiece W, the points of the sawteeth break through the work hardening layer to bite into the workpiece W deeply. Accordingly, even a workpiece that is likely to generate a work hardening layer can be easily cut.

Furthermore, since the biting ability of the sawteeth with respect to the workpiece is improved, generation of noise due to rubbing of the band saw blade against the workpiece W can be suppressed. Accordingly, cutting of the workpiece can be performed more quietly and the cutting plane can be made smoother than in the conventional band saw machine.

As can be understood from the above explanation, the control motor 139 is used as the motor for rotating the driving wheel 129, and the output shaft 141 of the control motor 139 and the driving wheel 129 are directly connected to each other. Accordingly, the configuration is made simple, the moment of inertia of the rotation system is reduced, the controllability of the traveling speed of the band saw blade 113 is improved, and the traveling speed of the band saw blade 113 can be easily oscillated.

The present invention is not limited to the embodiment described above, and can be embodied in other modes by performing modification appropriately. For example, not only the driving wheel 129 is directly connected to the control motor 139, however, also the driven wheel 131 may be directly connected to another control motor, so that the driving wheel 129 and the driven wheel 131 are respectively driven by separate control motors.

According to such a configuration, the control motor can be made small, to reduce the moment of inertia further, thereby improving the controllability. In this case, even in a configuration in which the both control motors are synchronously controlled, the rectangular pulse may be applied only to one of the control motors.

While the horizontal band saw machine is exemplified as the band saw machine in the above explanation, the first embodiment is also applicable to the vertical band saw machine.

A second embodiment of the present invention will be explained next.

Figure 7:
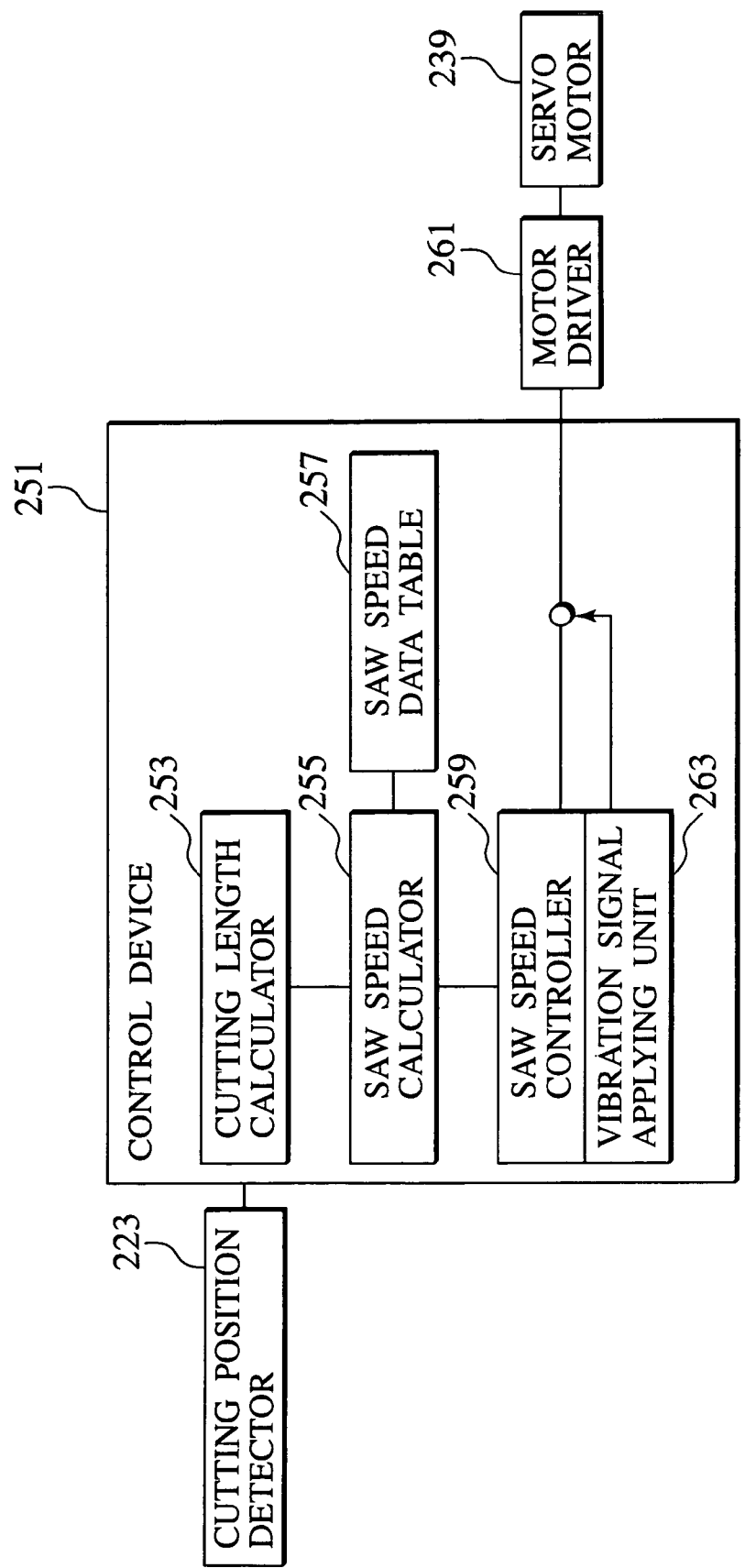
FIG. 7 is a block diagram conceptually illustrating the configuration of the relevant part that controls the saw speed of the band saw blade in a second embodiment.

In the second embodiment, the control device 151 in the first embodiment of the present invention is partly modified. A control device 251 in the second embodiment includes, as shown in FIG. 7, a saw speed controller 259 instead of the rotation speed controller 159, and a oscillation signal applying unit 263 instead of the rectangular pulse generator 163. Even the second embodiment can exhibit the same effect as in the first embodiment.

A third embodiment of the present invention will be explained. The third embodiment of the present invention relates to a cutting method of the workpiece by a sawing machine and the sawing machine. More specifically, the third embodiment relates to a cutting method and a sawing machine, in which when the noise, the wear, or the cutting resistance of the sawteeth reaches and exceeds a reference value at the time of cutting a workpiece, the rotation speed of the saw blade is oscillated to continue cutting of the workpiece. The third embodiment will be explained in detail with reference to the drawings.

In this embodiment, a control motor such as the servomotor is used as a motor 335 for rotating the driving wheel 129, and the output shaft of the control motor 335 and the driving wheel 129 are directly connected to each other without using a decelerator or the like. That is, the saw blade 113 is directly rotated by the control motor 335. When the saw blade 113 is a circular saw, the output shaft of the control motor 335 and the circular saw are directly connected to each other.

Figure 8:
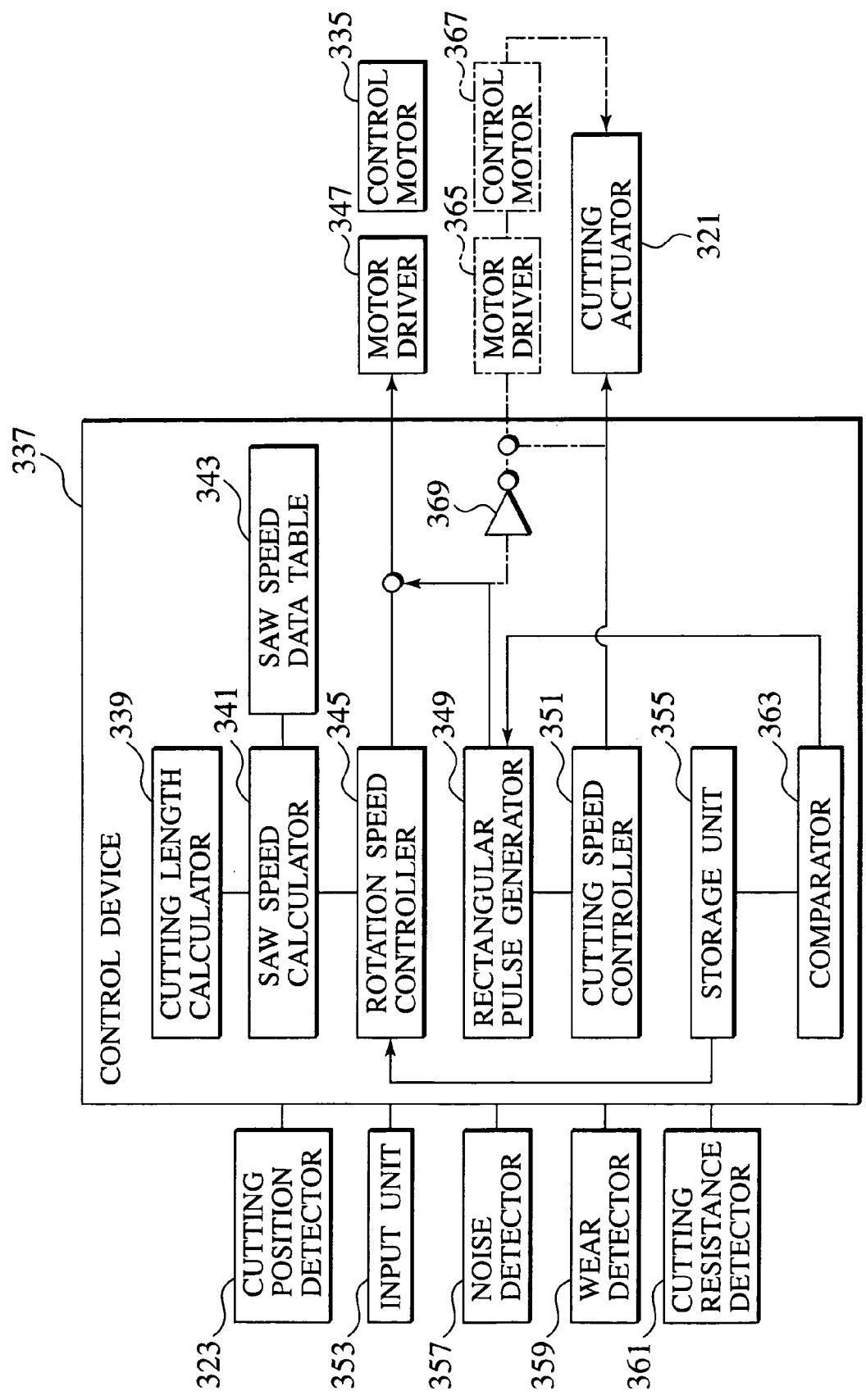
FIG. 8 is a functional block diagram conceptually illustrating the configuration of the relevant part that controls the saw speed of the band saw blade in a third embodiment.

A control device 337 such as a CNC unit shown in FIG. 8 is provided for controlling the sawing machine 101. As only the relevant part is shown conceptually and schematically in FIG. 8, the control device 337 includes a cutting length calculator 339 that calculates the cutting length of the workpiece W based on the position detected by a cutting position detector 323 for detecting the cutting position of the saw blade 113 with respect to the workpiece W, and the shape and the size of the workpiece W input beforehand.

Furthermore, the control device 337 includes a saw speed calculator 341 that calculates the traveling speed of the saw blade 113 based on the calculation result of the cutting length calculator 339. The saw speed calculator 341 searches the appreciate saw speed corresponding to the material and the cutting length of the workpiece W in a saw speed data table 343, in which the relation between the cutting length and the saw speed is stored in data corresponding to the material of the workpiece W.

Furthermore, the control device 337 includes a rotation speed controller 345 for controlling the rotation speed of the control motor 335 based on the calculation result of the saw speed calculator 341, so that the rotation speed of the control motor 139 is controlled via a motor driver 347 under the control of the rotation speed controller 345. A rectangular pulse generator 349 is equipped in the control device 337 for applying a rectangular pulse, as an example of a waveform having sharp rise and fall, to the motor driver 347, in order to oscillate the rotation speed of the control motor 335.

The rectangular pulse generator 349 oscillates, for example, the rotation speed of the control motor 335 rotating at a constant rotation speed under the control of the rotation speed controller 345, to oscillate the speed of the saw blade 113 so that the saw blade 113 rotating at a constant speed vibrates in the rotation direction (traveling direction) of the saw blade 113. In other words, the saw speed is instantaneously changed as if the saw blade 113, for example, traveling at a constant speed is performing vibratory cutting.

Furthermore, the control device 337 includes a cutting speed controller 351 for controlling the cutting speed of the saw blade 113 with respect to the workpiece W by controlling the operation of the hydraulic cylinder 321 for lifting as one example of the cutting actuator. The cutting speed controller 351 includes a rotation speed controller that controls a flow control valve when the cutting actuator is formed of a fluid pressure cylinder, or controls the rotation speed of the servomotor when the cutting actuator is formed of, for example, a ball screw or the like rotated by the servomotor.

When rotating the control motor 335 and operating a cutting actuator 321 to start cutting of the workpiece W, the cutting position of the saw blade 113 with respect to the workpiece W can be detected by the cutting position detector 323. Therefore, as in the conventional normal sawing machine, cutting (hollow cutting) is performed at a high speed until the saw blade 113 approaches the workpiece W, and when the saw blade 113 approaches the workpiece W, the cutting speed is controlled to a low speed. Cutting by the saw blade 113 is then performed with respect to the workpiece W at the low cutting speed.

In the initial stage of cutting until the saw blade 113 comes in contact with the workpiece W to cut the workpiece W slightly, the rotation speed of the saw blade 113 is controlled to a low speed under the control of the rotation speed controller 345. That is, at the time of start cutting of the workpiece W by the saw blade 113, the cutting speed and the rotation speed of the saw blade 113 are controlled to a low speed, so that a large load does not suddenly act on the sawteeth to cause broken teeth. Furthermore, at the end of cutting of the workpiece W by the saw blade 113, the rotation speed and the cutting speed with respect to the workpiece of the saw blade 113 are controlled to a low speed, in order to suppress occurrence of burr.

The cutting position of the saw blade 113 with respect to the workpiece W is detected by the cutting position detector 323, and the cutting length of the workpiece W is calculated by the cutting length calculator 339 based on the detected cutting position. The saw speed (rotation speed) corresponding to the cutting length is calculated by the saw speed calculator 341 based on the calculation result, and the saw speed is controlled corresponding to the cutting length of the workpiece W under the control of the rotation speed controller 345.

When the rotation speed of the control motor 335 is controlled via the motor driver 347 under the control of the rotation speed controller 345, and the saw blade 113 is driven to cut the workpiece W, the rectangular pulse is generated by the rectangular pulse generator 351 and applied to the motor driver 347, thereby oscillating the rotation speed of the control motor 335.

In other words, when the control motor 335 is in a rotating state at a constant speed, application of a positive rectangular pulse to the motor driver 347 instantaneously accelerates the rotation speed of the control motor 335. On the contrary, application of a negative rectangular pulse to the motor driver 347 instantaneously decelerates the rotation speed of the control motor 335. Therefore, by applying the rectangular pulse to the motor driver 347 from the rectangular pulse generator 351, the rotation speed of the control motor 335 can be instantaneously accelerated or decelerated so as to be oscillated, thereby oscillating the rotation speed of the saw blade 113.

That is, when the saw blade 113 cuts the workpiece W, the saw blade 113 vibrates in the rotation direction (moving direction), as if it is performing vibratory cutting. Accordingly, when the saw blade 113 is instantaneously accelerated, the saw blade 113 is suddenly moved vigorously, and hence, cutting of the workpiece W can be performed efficiently.

In a general machine tool, when vibratory cutting of the workpiece is performed by moving a cutting tool with respect to a rotating workpiece, high frequency of several kHz is applied to the cutting tool to vibrate the cutting tool minutely. In the sawing machine, when the rotation speed of the saw blade 113 is to be oscillated, it is necessary to oscillate the rotation speed of the control motor 335 for rotating the saw blade 113.

For example, in the band saw machine, however, the weight of the driving wheel 129, around which the saw blade 113 is wound, is large and the inertia is large. Furthermore, in a configuration in which a circular saw is directly connected to the output shaft of the control motor 335, the inertia of the circular saw is large. Hence, even if a high-frequency pulse is applied to the motor driver 347, it is difficult to oscillate the rotation speed of the control motor 335 as intended. Therefore, in order to oscillate the rotation speed of the control motor 335 to oscillate the rotation speed of the saw blade 113, it is desired to apply a rectangular pulse, which is of a low frequency of from several to several hundred HZ and has sharp rise and fall, to the motor driver 347. So long as the pulse is of low frequency of from several to several hundred HZ and has a waveform with sharp rise and fall, for example, a trapezoid wave or a sinusoidal wave may be applied.

That is, by applying the low-frequency rectangular pulse to the motor driver 347 by the rectangular pulse generator 349, the rotation speed of the control motor 335 and the rotation speed of the saw blade 113 can be oscillated.

As described above, when the rectangular pulse generator 349 applies the rectangular pulse to the motor driver 347 to cut the workpiece W by oscillating the rotation speed of the saw blade 113, the saw speed is instantaneously accelerated sharply at the time of rise of the rectangular pulse, and is instantaneously decelerated sharply at the time of fall of the rectangular pulse, when the rectangular pulse is applied by the rectangular pulse generator 349.

Therefore, the cutting actuator 321 is controlled by the cutting speed controller 351 at the time of fall of the rectangular pulse applied to the motor driver 347 by the rectangular pulse generator 349, to accelerate the cutting speed of the saw blade 113 with respect to the workpiece W instantaneously sharply, thereby enabling efficient biting into the workpiece W of the sawteeth of the saw blade 113.

That is, it is desired to oscillate the saw blade 113 in the rotation direction as well as the cutting speed of the saw blade 113 with respect to the workpiece W. In this case, by suddenly accelerating the cutting speed of the saw blade 113 with respect to the workpiece W when the rotation speed of the saw blade 113 is low, biting into the workpiece W of the sawteeth is performed efficiently. At this time, even if a work hardening layer is generated in the workpiece W, the points of the sawteeth break through the work hardening layer to bite into the workpiece W deeply. Accordingly, even a workpiece that is likely to generate a work hardening layer can be easily cut.

Furthermore, since the biting ability of the sawteeth with respect to the workpiece is improved, generation of noise due to rubbing of the saw blade against the workpiece W can be suppressed. Accordingly, cutting of the workpiece can be performed more quietly and the cutting plane can be made smoother than in the conventional sawing machine.

As can be understood, by applying the rectangular pulse to the control motor 347 by the rectangular pulse generator 349, the rotation speed of the saw blade 113 can be oscillated, and cutting of the workpiece W can be performed by the saw blade 113 as if performing vibratory cutting. However, for example, when a machining program according to a preset machining condition is stored in a storage unit 355 from an input unit 353 in order to perform cutting of the workpiece W according to a normal machining condition, and the rotation of the control motor 335 is controlled according to the stored machining condition to rotate the saw blade 113 and perform cutting of the workpiece W in the conventional manner, it is not necessary to oscillate the rotation speed of the saw blade 113 intentionally.

However, when the sawteeth of the saw blade 113 wear due to repetition of cutting of the workpiece W, the cutting property of the saw blade 113 with respect to the workpiece W degrades, and the saw blade 113 may rub against the workpiece W, thereby causing a work hardening layer in the cut section of the workpiece W. When the work hardening layer appears in the cut section, a noise may be generated due to rubbing of the saw blade 113 against the workpiece W.

Therefore, when wear occurs in the sawteeth of the saw blade 113 to generate noise, or when the cutting resistance increases, a noise detector 357, a wear detector 359, and a cutting resistance detector 361 are connected to the control device 337, in order to oscillate the rotation speed of the saw blade 113. The controller 37 includes a comparator 363 that compares the detected values of the respective detectors 357, 359, and 361 with the respective reference values stored in the storage unit 355.

The noise detector 357 is formed of, for example, a microphone, and is arranged at a position suitable for detecting noise generated at the time of cutting the workpiece W by the saw blade 113.

The wear detector 359 is for detecting the wear of the sawteeth of the saw blade 113, and for example, a configuration in which the sawteeth of the saw blade 113 are imaged by an image pick-up device, resonating with the rotation speed of the saw blade 113, to perform image processing can be adopted.

For the cutting resistance detector 361, a torque sensor for detecting the torque of the control motor 335 or an ammeter for detecting the current flowing through the control motor 335 may be employed.

According to the above configuration, when the value detected by the noise detector 357 is compared with the reference value prestored in the storage unit 355 by the comparator 363 and the detected value becomes larger than the reference value, or when the value detected by the wear detector 359 is compared with the reference value and the detected value becomes larger than the reference value, or when the value detected by the cutting resistance detector 361 is compared with the reference value and the detected value becomes larger than the reference value, the rectangular pulse generator 349 applies the rectangular pulse to the motor driver 347, to oscillate the rotation speed of the control motor 335, thereby oscillating the rotation speed of the saw blade 113. Furthermore, the cutting speed of the saw blade 113 with respect to the workpiece W is also oscillated.

Accordingly, it can be suppressed that the sawteeth of the saw blade 113 wear out to increase the noise, and that the cutting efficiency decreases. In other words, even when noise is likely to occur, generation of noise can be suppressed, thereby solving the problem in the conventional art.

When the cutting actuator 321 is operated by the motor driver 365 and the control motor 367, as shown by imaginary line in FIG. 8, the rectangular pulse generated by the rectangular pulse generator 349 may be inverted by an inverter 369, and applied to the motor driver 365.

While the horizontal band saw machine is exemplified as the band saw machine in the explanation of the third embodiment, the third embodiment is also applicable to the vertical band saw machine and the circular saw machine.

A fourth embodiment of the present invention will be explained below. The fourth embodiment relates to a method of reducing the noise generated by the band saw machine such as the horizontal band saw machine and the vertical band saw machine, and the band saw machine. More specifically, the fourth embodiment relates to a method of reducing the noise resulting from longitudinal vibrations of the band saw blade, and the band saw machine. The fourth embodiment will be explained below in detail with reference to the drawings.

A control motor 435 such as a servomotor for rotating the driving wheel 129 (FIG. 3) is fitted to the back of the wheel housing 127A, and an output shaft 141 of the motor 435 is directly connected to the driving wheel 129 without using a speed reducer.

Figure 9:
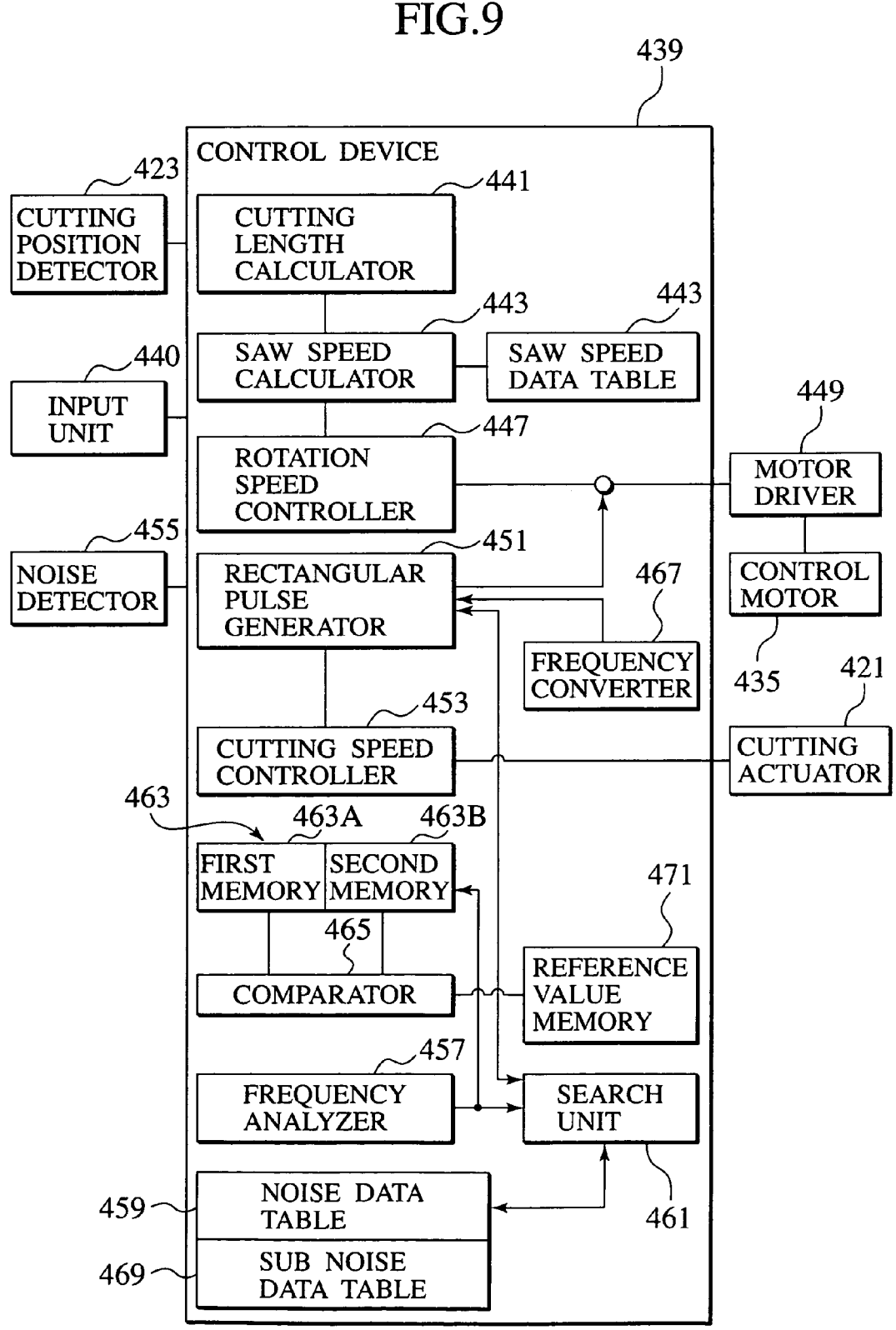
FIG. 9 is a functional block diagram conceptually illustrating the configuration of the relevant part that controls the saw speed of the band saw blade in a fourth embodiment.

A control device 439 such as a CNC unit is equipped for controlling the band saw machine 101. As shown in FIG. 9, where only the relevant part is conceptually and schematically, the control device 439 includes a cutting length calculator 441 that calculates the cutting length of the workpiece W based on the position detected by the cutting position detector 423 that detects the cutting position of the band saw blade 113 with respect to the workpiece W, and the shape and the size of the workpiece W input beforehand by an input unit 440.

Furthermore, the control device 439 includes a saw speed calculator 443 that calculates the traveling speed (rotation speed) of the band saw blade 113 based on the calculation result of the cutting length calculator 441. The saw speed calculator 443 searches an appropriate saw speed corresponding to the material and the cutting length of the workpiece W in a saw speed data table 445, in which the relation between the cutting length and the saw speed is stored in data corresponding to the material of the workpiece W.

The control device 439 includes a rotation speed controller 447 for controlling the rotation speed of the control motor 435 based on the calculation result of the saw speed calculator 443, so that the rotation speed of the control motor 435 is controlled via a motor driver 449 under the control of the rotation speed controller 447. A rectangular pulse generator 451 is equipped in the control device 439 for applying a rectangular pulse, as an example of pulses with sharp rise and fall, to the motor driver 449, to suddenly accelerate or decelerate the rotation speed of the control motor 435, thereby to oscillate the rotation speed of the control motor 439.

The rectangular pulse generator 451 oscillates, for example, the rotation speed of the control motor 435 rotating at a constant rotation speed under the control of the rotation speed controller 447, to oscillate the rotation speed of the band saw blade 113 so that the band saw blade 113 traveling at a constant speed oscillates in the traveling direction (moving direction) of the band saw blade 113. In other words, for example, the band saw blade 113 traveling and rotating at a constant speed is suddenly accelerated or decelerated to oscillate the rotation speed, so that the saw speed is instantaneously changed as if the band saw blade 113 is performing vibratory cutting.

Furthermore, the control device 439 includes a cutting speed controller 453 for controlling the operation of the hydraulic cylinder 421 for lifting, as one example of the cutting actuator, to control the cutting speed of the band saw blade 113 with respect to the workpiece W. The cutting speed controller 453 includes a rotation speed controller that controls a flow control valve when the cutting actuator is formed of a fluid pressure cylinder, or controls the rotation speed of the servomotor when the cutting actuator is formed of, for example, a ball screw or the like rotated by the servomotor.

When rotating the control motor 435 and operating the cutting actuator 421 to start cutting of the workpiece W, the cutting position of the band saw blade 113 with respect to the workpiece W can be detected by the cutting position detector 423. Therefore, as in the conventional normal band saw machine, cutting (hollow cutting) is performed at a high speed until the band saw blade 113 approaches the workpiece W, and when the band saw blade 113 approaches the workpiece W, the cutting speed is controlled to a low speed. Cutting by the band saw blade 113 is then performed with respect to the workpiece W at the low cutting speed.

In the initial stage of cutting until the band saw blade 113 comes in contact with the workpiece W to cut the workpiece W slightly, the traveling speed of the band saw blade 113 is controlled to a low speed under the control of the rotation speed controller 447, so as not to cause broken teeth. That is, at the time of start cutting of the workpiece W by the band saw blade 113, the cutting speed and the saw speed are controlled to a low speed so that a large load does not suddenly act on the sawteeth to cause broken teeth. Furthermore, at the end of cutting of the workpiece W by the band saw blade 113, the traveling speed and the cutting speed with respect to the workpiece of the band saw blade 113 are controlled to a low speed, in order to suppress occurrence of burr.

The cutting position of the band saw blade 113 with respect to the workpiece W is detected by the cutting position detector 423, and the cutting length of the workpiece W is calculated by the cutting length calculator 441 based on the detected cutting position. The saw speed corresponding to the cutting length is calculated by the saw speed calculator 443 based on the calculation result, and the saw speed is controlled corresponding to the cutting length of the workpiece W under the control of the rotation speed controller 447.

As described above, when the rotation speed of the control motor 435 is controlled via the motor driver 449 under the control of the rotation speed controller 447, and the band saw blade 113 is driven to cut the workpiece W, the rectangular pulse is generated by the rectangular pulse generator 451 and applied to the motor driver 449, so that the rotation speed of the control motor 435 is suddenly accelerated or decelerated, to be oscillated.

In other words, when the control motor 435 is in a rotating state at a constant speed, application of a positive rectangular pulse from the rectangular pulse generator 451 to the motor driver 449 instantaneously accelerates the rotation speed of the control motor 435. On the contrary, application of a negative rectangular pulse to the motor driver 449 instantaneously decelerates the rotation speed of the control motor 435. Therefore, by applying the rectangular pulse to the motor driver 449 from the rectangular pulse generator 451, the rotation speed of the control motor 435 can be oscillated, thereby oscillating the traveling speed of the band saw blade 113.

That is, when the band saw blade 113 cuts the workpiece W, the band saw blade 113 vibrates in the traveling direction (moving direction), as if it is performing vibratory cutting. Accordingly, when the band saw blade 113 is instantaneously accelerated, the band saw blade 113 is suddenly moved vigorously, and hence, cutting of the workpiece W can be performed efficiently.

In a general machine tool, when vibratory cutting of the workpiece is performed by moving a cutting tool with respect to a rotating workpiece, high frequency of several kHz is applied to the cutting tool to vibrate the cutting tool minutely. In the band saw machine, when the traveling speed of the band saw blade 113 is to be oscillated, it is necessary to oscillate the rotation speed of the control motor 439 for rotating the band saw blade 113.

In the band saw machine, however, since the weight of the driving wheel 129 around which the band saw blade 113 is wound is large and the inertia is large, even if a high-frequency pulse is applied to the motor driver 449, it is difficult to oscillate the rotation speed of the control motor 435 as intended. Therefore, in order to oscillate the rotation speed of the control motor 435 to oscillate the traveling speed of the band saw blade 113, it is desired to apply a rectangular pulse, which is of a low frequency of from several to several hundred HZ, and has sharp rise and fall, to the motor driver 449. So long as the pulse is of low frequency of from several to several hundred HZ and has a waveform with sharp rise and fall, for example, a trapezoid wave or a sinusoidal wave may be applied.

That is, by applying the low-frequency rectangular pulse to the motor driver 449 by the rectangular pulse generator 451, the rotation speed of the control motor 435 and the traveling speed of the band saw blade 113 can be oscillated.

As described above, when the rectangular pulse generator 451 applies the rectangular pulse to the motor driver 449 to cut the workpiece W by oscillating the traveling speed of the band saw blade 113, the saw speed is instantaneously accelerated sharply at the time of rise of the rectangular pulse, and is instantaneously decelerated sharply at the time of fall of the rectangular pulse, when the rectangular pulse is applied by the rectangular pulse generator 451.

Therefore, the cutting actuator 421 is controlled by the cutting speed controller 453 at the time of fall of the rectangular pulse applied to the motor driver 449 by the rectangular pulse generator 451, to accelerate the cutting speed of the band saw blade 113 with respect to the workpiece W instantaneously sharply, thereby enabling efficient biting into the workpiece W of the sawteeth of the band saw blade 113.

That is, it is desired to oscillate the band saw blade 113 in the traveling direction as well as the cutting speed of the band saw blade 113 with respect to the workpiece W. In this case, by suddenly accelerating the cutting speed of the band saw blade 113 with respect to the workpiece W when the traveling speed of the band saw blade 113 is low, biting into the workpiece W of the sawteeth is performed efficiently. At this time, even if a work hardening layer is generated in the workpiece W, the points of the sawteeth break through the work hardening layer to bite into the workpiece W deeply. Accordingly, even a workpiece that is likely to generate a work hardening layer can be easily cut.

Furthermore, since the biting ability of the sawteeth with respect to the workpiece is improved, generation of noise resulting from longitudinal vibrations of the band saw blade 113 due to rubbing of the band saw blade against the workpiece W can be suppressed. Accordingly, cutting of the workpiece can be performed more quietly and the cutting plane can be made smoother than the conventional band saw machine.

As can be understood from the above explanation, the control motor 435 is used as the motor for rotating the driving wheel 129, and the output shaft 141 of the control motor 435 and the driving wheel 129 are directly connected to each other. Accordingly, the configuration is made simple, the moment of inertia of the rotation system is reduced, the controllability of the traveling speed of the band saw blade 113 is improved, and the traveling speed of the band saw blade 113 can be easily oscillated.

As can be understood, since the rectangular pulse generator 451 applies the rectangular pulse to the control motor 435 rotation-controlled under the control of the rotation speed controller 447, to suddenly accelerate or decelerate the rotation speed of the control motor 435, the rotation speed of the control motor 435 can be oscillated, and generation of noise resulting from longitudinal vibrations of the band saw blade 113 at the time of cutting the workpiece W can be suppressed and reduced.

The longitudinal vibration of the band saw blade 113 in the band saw machine 101 is a natural frequency of the band saw blade 113 wound between the driving wheel 129 and the driven wheel 131, and hence, can be determined uniquely. The frequency band of the natural frequency changes according to the plate thickness of the band saw blade 113, the size of the band saw blade such as the band width, the tensile strength when the band saw blade 113 is pulled by the driven wheel 131, and the wheel distance between the driving wheel 129 and the driven wheel 131, however, it is a peculiar mode of vibration of respective band saw machines 101, and is from about 1200 to 2000 Hz.

Therefore, a noise detector 455 such as a microphone is equipped for detecting noise at the time of cutting the workpiece W by the band saw machine 101, and a frequency analyzer 457 that performs frequency analysis of noise detected by the noise detector 455 is equipped in the control device 439. The control device 439 also includes a noise data table 459.

The noise data table 459 is a data table in which the mode of vibration of the noise of from 1200 Hz to 2000 Hz is divided into a plurality of frequency bands, for example, 1200 Hz to 1400 Hz, 1401 Hz to 1600 Hz, 1601 Hz to 1800 Hz, and 1801 Hz to 2000 Hz, and the frequency band of the rectangular pulse to be applied is associated with the divided respective frequency bands, wherein the association between the respective frequency bands of the noise and the frequency bands of the rectangular pulse is determined experimentally beforehand.

Figure 10:
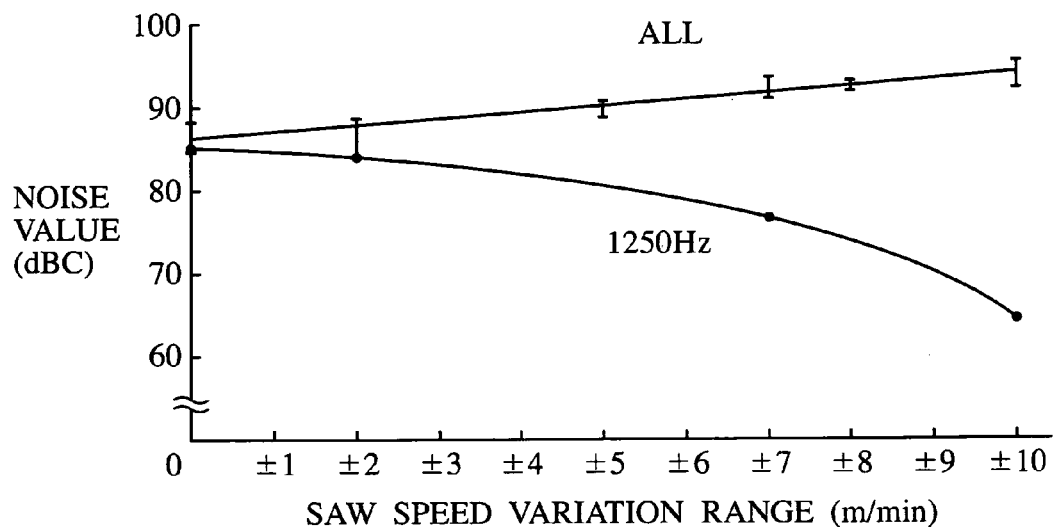
FIG. 10 is a diagram illustrating the relation between a saw speed variation range and a noise value.
Figure 11:
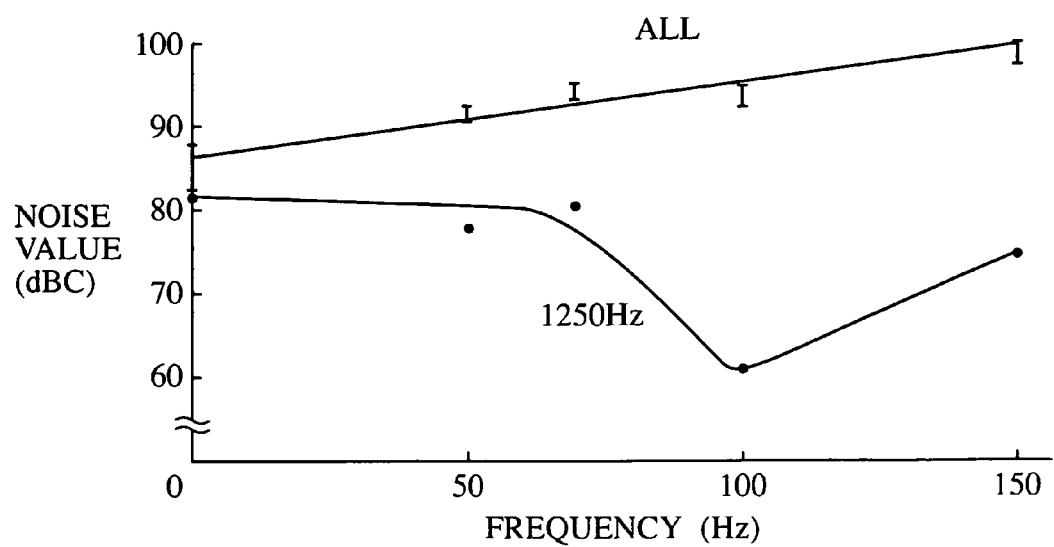
FIG. 11 is a diagram illustrating a relation between a frequency and the noise value.

With reference to FIGS. 10 and 11, the experimental data of noise values measured when performing cutting by applying the pulse will be explained.

FIG. 10 illustrates the result of a test carried out under such conditions that a material to be cut is SUS 304 having a diameter of 200 millimeters, a saw blade to be used is SGLB EX 2/3P (44,000 square centimeters), a reference saw speed is 40 meters per minute, the oscillation frequency is 100 hertz, the cutting rate is 22 square centimeters per minute (override 100%). The result is obtained by measuring the noise values when the fluctuation of the saw speed is changed. The natural frequency of the sawing machine is 1250 hertz.

On the other hand, FIG. 11 illustrates the result of a test carried out under such conditions that a material to be cut is SUS 304 having a diameter of 200 millimeters, a saw blade to be used is SGLB EX 2/3P (44,000 square centimeters), the saw speed is 40 meters per minute (±7 meters per minute), the cutting rate is 33 square centimeters per minute (override 150%). The result is obtained by measuring the noise values when the oscillation frequency to be applied is changed. The natural frequency of the sawing machine is 1250 hertz.

From the test results, it is found that there is a tendency such that the noise is reduced by applying the pulse frequency near 70 to 150 hertz. Particularly, it is found that remarkable effects can be obtained in the range of from 100 to 125 hertz.

The control device 439 also includes a search unit 461 that searches the noise data table 459 based on the frequency and the noise level analyzed by the frequency analyzer, and inputs the frequency band of the searched rectangular pulse to the rectangular pulse generator 451, and a memory 463 including first and second memories 463A and 463B for temporarily storing the noise level analyzed by the frequency analyzer 457.

Furthermore, the control device 439 includes a comparator 465 that compares the noise levels stored in the first and the second memories 463A and 463B with each other, and a sub noise data table 469 in which when the noise level becomes minimum as the result of comparison by the comparator, the frequency analyzed by the frequency analyzer 457 and the frequency of the rectangular pulse converted by a frequency converter 467 are stored in association with each other.

In such a configuration, the rotation of the control motor 435 is controlled under the control of the rotation speed controller 447, based on the material, the shape, and the size of the workpiece W input from the input unit 440, and a preset cutting condition, and the cutting actuator 421 is controlled by the cutting speed controller 453 based on the cutting condition to perform cutting of the workpiece W by the band saw blade 113. When the band saw blade 113 is worn out gradually, the band saw blade 113 rubs against the workpiece W to generate noise.

The noise at the time of cutting the workpiece W is detected by the noise detector 455, and the detected noise level is compared with the reference value stored in a reference value memory 471. When the detected noise level is larger than the reference value, the rectangular pulse generator 451 applies the rectangular pulse to the motor driver 449, to oscillate the rotation speed of the control motor 435, thereby suppressing (reducing) the noise.

In other words, the noise detected by the noise detector 455 is frequency-analyzed by the frequency analyzer 457, to obtain a frequency at which the noise level becomes the highest. The maximum noise level is stored in the first memory 463A of the memory 463, and the noise level stored in the first memory 463A is compared with the reference value stored in the reference value memory 471 by the comparator 465.

The search unit 461 searches the noise data table 459 and the sub noise data table 469 based on the natural frequency at the maximum noise level analyzed by the frequency analyzer 457. When the data corresponding to the natural frequency can be searched from the noise data table 469, the frequency of the rectangular pulse of the rectangular pulse generator 451 is converted based on the searched data.

When there is no data corresponding to the natural frequency in the sub noise data table 469, the search unit 461 searches a frequency band including the natural frequency from the noise data table 459, and selects a desired frequency from the frequency band of the rectangular pulse associated with the frequency band, to designate the frequency of the rectangular pulse generated by the rectangular pulse generator 451 as the desired frequency.

The noise when the rectangular pulse of the desired frequency is applied to the motor driver 449 to cut the workpiece W is detected by the noise detector 455, and the noise level at this time is stored in the second memory 463B of the memory 463. The noise levels stored in the first and the second memories 463A and 463B are compared with each other, and when the noise level in the second memory 463B is smaller than that in the first memory 463A, it is stored in the first memory 463A. At the time of first comparison, the rectangular pulse is applied to the motor driver 449 in order to reduce the noise level. Therefore, the noise level stored in the second memory 463B is smaller than the noise level initially stored in the first memory 463A.

Subsequently, the frequency of the rectangular pulse generated by the rectangular pulse generator 451 is converted by the frequency converter 467 for every predetermined numbers, and the noise level detected each time is stored in the second memory 463B of the memory 463, to obtain the minimum noise level by comparing the detected noise level with the noise level stored in the first memory 463A. The frequency of the rectangular pulse when the noise level becomes the lowest is associated with the natural frequency analyzed by the frequency analyzer 457, and stored in the sub noise data table 469.

As can be understood, the noise generated at the time of cutting the workpiece W by the band saw blade 113 is detected by the noise detector 455, and the detected noise is frequency-analyzed by the frequency analyzer 457, to obtain the natural frequency at which the noise level becomes the highest. In order to reduce the noise level due to the natural frequency, the frequency of the rectangular pulse applied by the rectangular pulse generator 451 to the motor driver 449 is converted, and the noise levels detected every time the frequency of the rectangular pulse is converted are compared to obtain the minimum noise level. Accordingly, automation for reducing the noise can be realized.

In other words, the rotation speed of the band saw blade 113 is oscillated by oscillating the rotation speed of the control motor 435, to realize the vibratory cutting mode of the workpiece W, thereby suppressing and reducing the noise resulting from longitudinal vibrations of the band saw blade 113. Accordingly, the noise due to longitudinal vibrations of the band saw blade can be reduced more effectively, as compared with the conventional configuration in which the vibration-isolating roller is pressed against the band saw blade.

Entire contents of Japanese Patent Applications No. 2003-057655 (filed on Mar. 4, 2003), No. 2003-392256 (filed on Nov. 21, 2003), No. 2003-435627 (filed on Dec. 26, 2003), and No. 2003-435646 (filed on Dec. 26, 2003) are incorporated by reference in the specification of the present application.

The embodiments of the present invention described above are to be considered not restrictive, and the invention can be embodied in other various forms, as changes are appropriately made.

The invention claimed is:

1. A cutting method of a workpiece by a sawing machine, comprising:
   applying a pulse to a motor driver by a pulse generator to oscillate a rotation speed of a control motor and a rotation and a cutting speed of a saw blade,
   wherein when the pulse generator applies a rectangular pulse to the motor driver to cut the workpiece by oscillating the rotation speed of the saw blade, the rotation speed of the saw blade is instantaneously accelerated sharply at a time of a rise of the rectangular pulse, and is instantaneously decelerated sharply at a time of a fall of the rectangular pulse,
   and a cutting actuator is controlled by a cutting speed controller at the time of the fall of the rectangular pulse applied to the motor driver so as to accelerate the cutting speed of the saw blade.

\* \* \* \* \*